United States Patent [19]
Ohmori et al.

[11] 3,725,445
[45] Apr. 3, 1973

[54] DOUBLE SALT OF ZINC ETHYLENE-BIS-DITHIOCARBAMATE AND N-DODECYLGUANIDINE AND PREPARATION THEREOF

[75] Inventors: Kaoru Ohmori, Yono; Mituo Nakajima, Tokyo; Shuichi Ishida, Ohmiya; Osamu Yamada, Tokyo, all of Japan

[73] Assignee: Nippon Kayaku Co., Ltd., Tokyo, Japan

[22] Filed: Jan. 13, 1971

[21] Appl. No.: 106,181

[52] U.S. Cl...............................260/429.9, 424/286
[51] Int. Cl.................................................C07f 3/06
[58] Field of Search...................................260/429.9

[56] References Cited

FOREIGN PATENTS OR APPLICATIONS

| | | | |
|---|---|---|---|
| 1,042,569 | 11/1958 | Germany | 260/429.9 |
| 1,235,287 | 3/1967 | Germany | 260/429.9 |

OTHER PUBLICATIONS

Chemical Abstracts, Vol 54, 21592h. (1960).
Chemical Abstracts, Vol 62, 13789e (1965).

*Primary Examiner*—H. Sneed
*Attorney*—Russell & Nields

[57] ABSTRACT

A fungicide for agricultural and horticultural use is obtained by adding a mixed solution of ammonium ethylene-bis-dithiocarbamate and n-dodecylguanidine to an aqueous solution of zinc chloride, reacting these reactants together to prepare a double salt of zinc ethylene-bis-dithiocarbamate and n-dodecylguanidine and then mixing therewith auxiliary substances such as extending agent, emulsifier, wetting agent, binding agent, etc. The fungicide is useful as a preparation for controlling diseases of fruit-trees, such as Alternaria leaf spot of apple, and black spot and scab of Japanese pear, etc., and exhibits poor phytotoxicity to plants when compared with n-dodecylguanidine acetate preparations.

4 Claims, 1 Drawing Figure

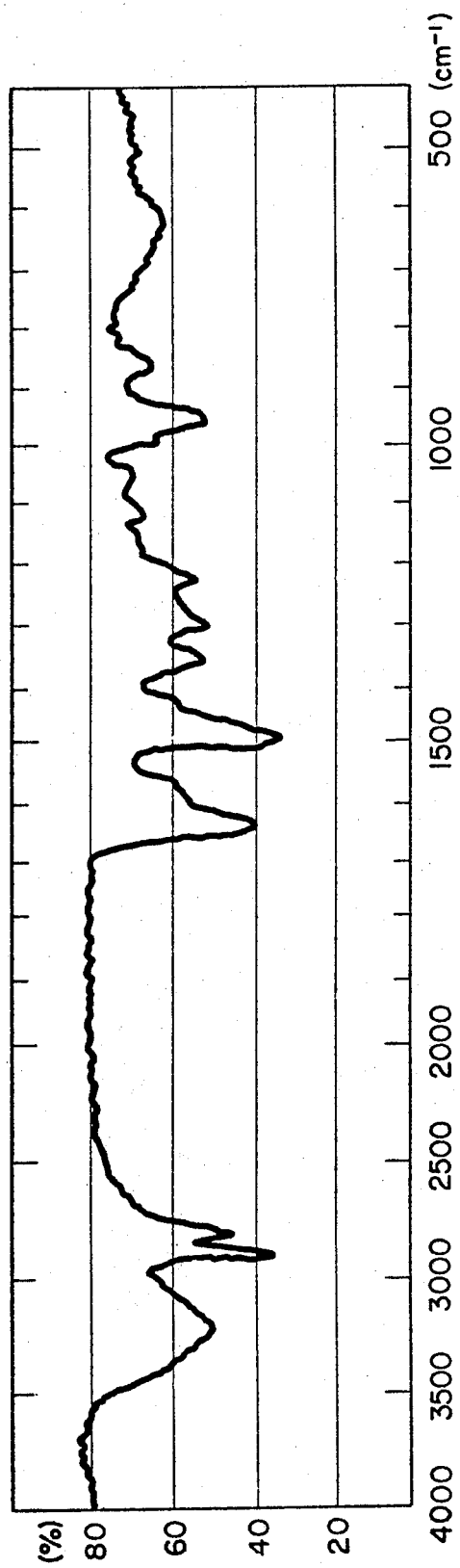

DOUBLE SALT OF ZINC ETHYLENE-BIS-DITHIOCARBAMATE AND N-DODECYLGUANIDINE AND PREPARATION THEREOF

DETAILED DESCRIPTION OF THE INVENTION

This invention relates to a fungicide for agricultural and horticultural use containing as active ingredient a double salt of zinc ethylene-bis-dithiocarbamate and n-dodecylguanidine represented by the formula:

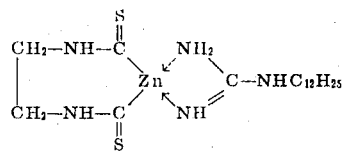

as well as a process for the preparation of the active ingredient.

n-Dodecylguanidine acetate is now used chiefly as a preparation for controlling diseases of fruit-trees. However, it is often observed that inasmuch as n-dodecylguanidine acetate is a dissociable salt, it functions phytotoxically or that incorporation of other fungicides or insecticides into n-dodecylguanidine acetate with a view to broadening the effective range incurs change in the effect of incorporated agents, resulting rather in disadvantage.

After making a variety of researches for overcoming the drawbacks of said preparation, we have found that when n-dodecylguanidine is converted into a new double salt with zinc ethylene-bis-dithiocarbamate, the double salt not only exhibits excellent fungicidal effect but also is hardly soluble in water, thus serving to remove phytotoxicity as seen in the use of n-dodecylguanidine acetate or undesirable effect to other preparations incorporated together. This invention has been accomplished on the basis of the above finding.

The compound utilizable as the active ingredient of this invention can be obtained in a theoretical yield by adding dropwise a mixed solution of ammonium ethylene-bis-dithiocarbamate and n-dodecylguanidine in methanol to an aqueous solution of a water-soluble zinc salt under agitation at 0°–30° C., filtering a double salt immediately precipitated, washing it with water and then drying the double salt. This compound is a yellowish white powder and hardly soluble in water and organic solvents.

n-Dodecylguanidine used for this reaction is obtained by neutralizing its acetate, hydrochloride or sulfate with a basic substance such as sodium hydroxide. Preferable as the water-soluble zinc salt is zinc chloride or zinc sulfate. Mentioned as the reaction solvent is water, methanol, ethanol or a mixed solvent of water with methanol or ethanol.

The fungicide of this invention for agricultural and horticultural use can be employed for control of a number of diseases of fruit-trees including Alternaria leaf spot of apple, black spot and scab of Japanese pear.

For the better understanding, the excellent fungicidal effect of the active compound of this invention will be illustrated hereunder by way of experiments.

Experiment 1: The preventive effect on Alternaria leaf spot of apple caused by *Alternaria mali* by means of leaf detached test Detached leaves of apple (Star-king delicious species) were dipped into the fungicide solution previously diluted to a given concentration, taken out of the solution, dried and then innoculated with Alternaria mali by means of spraying. The innoculated leaves were allowed to keep in a moist chamber at 27° C. for 3 days and then the rating of disease development was observed. The result is shown in Table 1 below.

TABLE 1

| Test sample | The rating of disease development (concentration: mcg./ml.) | | |
|---|---|---|---|
| | 1000 | 500 | 250 |
| The active compound of this compound | 1 | 1 | 2 |
| Control (Difolatan) | 1 | 2 | 2 |
| fungus innoculated | | 5 | |
| Untreated fungus not innoculated | 0 | | |

Remarks: (1) The rating of the development of disease in the table was classified into the following six grades in accordance with the rate of diseased area:

| Healthy | | 0 |
|---|---|---|
| Diseased area | 1 – 20% | 1 |
| | 21 – 40% | 2 |
| | 41 – 60% | 3 |
| | 61 – 80% | 4 |
| | 81 – 100% | 5 |

(2) Difoltan (trade name): N-tetrachloroethylthio-4-cyclohexene-1,2-dicarboximide As is evident from Table 1, the fungicide of this invention for agricultural and horticultural use exhibits excellent preventive effect on Alternaris leaf spot of apple.

Experiment 2: A pot test for determining the preventive effect on the disease of black spot of Japanese pear caused by *Alternaria kikuchiana*

A liquid preparation of the fungicide of this invention was sprayed on seedlings of pear (Nijusseiki species) in an amount of 100 ml. for each seedling. After drying, the seedlings were innoculated with spores of *Alternaria kikuchiana* and allowed to keep overnight in a moist chamber and next in a green house for 4 days and thereafter the rating of the disease development was observed. The results are shown in Table 2 below.

TABLE 2

| Test sample | Concentration (ppm) | Percentage of contraction | Rating of the effect |
|---|---|---|---|
| The active compound of this invention (20% wettable preparation) | 1000 | 51.6 | 83.4 |
| Control (Difolatan 80% wettable preparation) | 1000 | 72.0 | 80.4 |
| Untreated | — | 100.0 | 0 |

Remarks: (1) The rating of the effect in the table was calculated according to the following equation:

$$\text{The rating of the effect} = \left(1 - \frac{\text{Rating of disease (A) in the treated area}}{\text{Rating of disease (A) in the untreated area}}\right) \times 100$$

wherein $A = [(b \times 1) + (c \times 2) + (d \times 3)]/[(a+b+c+d)]$ a: the number of healthy leaves
b: the number of slightly diseased leaves (the diseased area being less than one third of the surface area of leaf)
c: the number of moderately diseased leaves (the diseased area being from one third to two-thirds of the surface area of leaf)
d: the number of considerably diseased leaves (the diseased area being more than two-thirds of the surface area of leaf)
  a. Difolatan: Same as (2) in Remarks incidental to Table 1

As is evident from Table 2, the fungicide of this invention for agricultural and horticultural use exhibits excellent preventive effect on the disease of black spot of pear.

Experiment 3: The control effect against pear caused by *Venturia nashicola*

A liquid preparation of the fungicide was sprayed on 4-year young trees of pear (Chojuro species) in an amount of 1 liter for each tree on May 19, June 2 and 17, July 1, 15 and 29 and August 12 and 26 (8 times in all) and the condition of the disease was checked on September 3, the result being shown in Table 3 below.

TABLE 3

| Test Sample | Concentration (ppm) | Rate of Contraction(%) | Phytotoxicity |
|---|---|---|---|
| The active compound of this invention (20% wettable preparation) | 1000 | 0.6 | $-\approx\pm$ |
| Control: n-dodecylguanidine acetate (65% wettable preparation) | 650 | 0.7 | ++ |
| Untreated | — | 43.3 | |

As is evident from Table 3, the fungicide of this invention for agricultural and horticultural use exhibits excellent controlling effect against pear scab caused by *Venturia nashicola* but poor phytotoxicity to pear, when compared with n-dodecylguanidine acetate used as control.

Experiment 4: A test on phytotoxicity against pear (Chojuro species)

A liquid preparation of the fungicide was sprayed on seedlings of pear (Chojuro species) in an amount of 100 ml. for each seedling on May 4, 16 and 30 and June 13 and 17 (5 times in all) and the condition of phytotoxicity was checked on June 27, the result being shown in Table 4 below.

TABLE 4

| Test sample | Concentration (ppm) | Rate of phytotoxicity | Rating of phytotoxicity |
|---|---|---|---|
| The active compound of this invention (20% wettable preparation) | 4000 | 13.7 | 0.14 |
| | 2000 | 6.6 | 0.07 |
| | 1000 | 0.2 | 0.01 |
| Control: n-dodecylguanidine acetate (65% wettable preparation) | 4000 | 21.0 | 0.40 |
| | 2000 | 15.2 | 0.16 |
| | 1000 | 6.5 | 0.06 |
| Untreated | — | 0 | 0 |

Remarks: 1. The rating of phytotoxicity in the table was calculated according to the following equation:

$$\text{The rating of phytotoxicity} = \frac{\left(\begin{array}{c}\text{the number}\\\text{of A} \times 3\end{array}\right) + \left(\begin{array}{c}\text{the number}\\\text{of B} \times 2\end{array}\right) + \left(\begin{array}{c}\text{the number}\\\text{of C} \times 1\end{array}\right)}{\text{The number of total leaves}}$$

A: leaves suffered serious phytotoxicity the spot area being more than two-thirds of the surface area of leaf
B: leaves suffered moderate phytotoxicity the spot area being from one-third to two thirds of the surface area of leaf
C: leaves suffered slight phytotoxicity the spot area being less than one-third of the surface area of leaf Table 4 obviously shows that the fungicide of this invention for agricultural and horticultural use exhibits very poor phytotoxicity to pear (Chojuro species) as compared with n-dodecylguanidine acetate used as control.

When the active compound of this invention is practically employed as fungicide for agricultural and horticultural use, the compound may be employed as such or with a suitable carrier in the form of a wettable preparation, dust, fine granule or, if necessary, suspension. When the compound is used in the form of a wettable preparation or suspension, it may preferably be diluted with water so that the compound is contained in an amount of about 750–1250 ppm. However, the concentration may be varied according to the condition of disease. By the term "carrier" used herein is meant a carrier which brings the compound into contact with pathogenic fungi. Mentioned as solid carrier are clay, kaolin, talc, diatomaceous earth, silica, calcium carbonate, etc. Mentioned as liquid carrier are benzene, alcohols, acetone, xylene, methylnaphthalene, cyclohexanone, dimethylformamide, dimethylsulfoxide, animal and vegetable oils, fatty acids and their esters, various kinds of surfactants, etc.

It is also possible to enhance the effect by appropriately mixing the fungicide with auxiliary substances usually employed for agricultural preparations, such as extending agent, emulsifier, wetting agent and binding agent.

The active compound or fungicide of this invention for agricultural and horticultural agent may also be used in admixture with other agricultural fungicides, insecticides, nematicides, herbicides, plant growth regulators, soil modifying agents or fertilizers.

This invention will be explained more in detail by way of examples wherein "part" is shown by weight.

Example 1

8.2 Grams (0.025 mol) of 87.5 percent n-dodecylguanidine acetate were dissolved into 50 ml. of methanol. To this solution was added at a temperature below 10° C. a solution of 1.1 g. (0.025 mol) of sodium hydroxide dissolved in a mixture of 2 ml. of water and 5 ml. of methanol. The resulting solution was then admixed with 15 g. (0.025 mol) of an aqueous solution of 41 percent ammonium ethylene-bis-dithiocarbamate to prepare a mixed solution of n-dodecylguanidine and ammonium ethylene-bis-dithiocarbamate.

The mixed solution was added dropwise at about 20° C. in 20–30 minutes to an aqueous solution of 4 g. (0.027 mol) of zinc chloride having a purity of at least 91 percent dissolved into 50 ml. of water. Addition of the mixed solution was carried out under efficient agitation. 30 minutes after the addition, a precipitated double salt of zinc ethylene-bis-dithiocarbamate and n-dodecylguanidine was filtered, washed with water and then dried to obtain 12 g. (yield: 100.3 percent) of the end product.

The double salt thus obtained is a new compound which has an IR-absorption spectral curve as shown in FIG. 1 and undergoes gradual decomposition at a temperature of 200° C. or higher.

Example 2

A wettable preparation is obtained by thoroughly mixing 20 parts of a double salt of zinc ethylene-bis-dithiocarbamate and n-dodecylguanidine with 80 parts of an adjuvant such as clay. This preparation is suspended into water and used as spraying liquid.

Example 3

A dust preparation is obtained by mixing 5 parts of a double salt of zinc ethylene-bis-dithiocarbamate and n-dodecylguanidine with 60 parts of talc, 30 parts of bentonite and 5 parts of dispersant and wetting agent and crushing the mixture. This preparation is directly dusted over plants.

What is claimed is:

1. A fungicide for agricultural and horticultural use which comprises as active ingredient a double salt of zinc ethylene-bis-dithiocarbamate and n-dodecylguanidine represented by the formula:

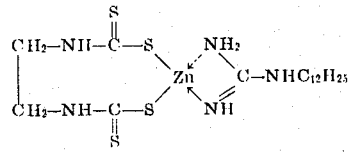

2. A process for the preparation of a double salt of zinc ethylene-bis-dithiocarbamate and n-dodecylguanidine as active ingredient, which comprises adding a mixed solution of ammonium ethylene-bis-dithiocarbamate and n-dodecylguanidine to an aqueous solution of a water-soluble zinc salt and reacting these compounds together.

3. A process according to claim 2 wherein zinc chloride or zinc sulfate is used as the water-soluble zinc salt.

4. A process according to claim 2 wherein n-dodecylguanidine is used in the form of its acetate, hydrochloride or sulfate.

* * * * *